(12) United States Patent
Newman, Jr.

(10) Patent No.: US 7,511,979 B2
(45) Date of Patent: Mar. 31, 2009

(54) AUTOMATIC PHASE CONVERTER

(76) Inventor: Robert Charles Newman, Jr., 2955 Main Rd. East, Emmaus, PA (US) 18049

( * ) Notice: Subject to any disclaimer, the term of this patent is extended or adjusted under 35 U.S.C. 154(b) by 358 days.

(21) Appl. No.: 11/207,621

(22) Filed: Aug. 12, 2005

(65) Prior Publication Data

US 2007/0035978 A1  Feb. 15, 2007

(51) Int. Cl.
*H02M 5/00* (2006.01)
(52) U.S. Cl. ...................................... 363/149
(58) Field of Classification Search ............ 363/49, 363/65, 148, 149, 150
See application file for complete search history.

(56) References Cited

U.S. PATENT DOCUMENTS

| | | | | |
|---|---|---|---|---|
| 3,354,376 | A | * | 11/1967 | Corey et al. ................ 363/2 |
| 5,111,376 | A | * | 5/1992 | Mehl ........................ 363/71 |
| 5,969,957 | A | * | 10/1999 | Divan et al. ................ 363/36 |
| 6,084,785 | A | * | 7/2000 | Kunisada et al. ............ 363/37 |
| 2004/0057257 | A1 | * | 3/2004 | Sarlioglu et al. ............ 363/49 |

OTHER PUBLICATIONS www.kayind.com/products_application/MA.htm, Phasemaster Type MA, Jul. 18, 2005, 2 pages.

Kay Industries, Phasemaster Automatic Rotary Phase Converter for Unattended applications, Jul. 2, 2001, 1 page.
Kay Industries, Phasemaster Installation Manual, Jun. 1, 2001, 12 pages.
David Getts, Obtain 3 Phase Power with a Converter, pp. 44-45, Woodshop News, Jul. 2005, vol. XIX-#8, published by Woodshop News, 10 Bokum Rd. Essex, CT 06426 USA article from internet archive at: www.woodshopnews.com included as 3 page print-out of orginal article as listed above.

* cited by examiner

*Primary Examiner*—Adolf Berhane

(57) ABSTRACT

Systems for converting single phase power to three phase power are well known, however, these systems may be noisy and wasteful of electrical power because they are prone to being left on for long periods of time when three phase power is not required. To overcome these disadvantages, these converters would be manually started and stopped as necessary. This invention solves these problems by providing a system that automatically controls a three phase converter based on electrical characteristics of the connected three phase load. The invention may detect when a three phase load requires power to operate and enables a three phase converter to provide the required power. Upon completion of the requirement of power, the system of the invention may shut down the converter. Additionally, the system of the invention may signal other electrical devices based on various electrical conditions of the connected three phase load.

18 Claims, 11 Drawing Sheets

AUTOMATIC PHASE CONVERTER

BACKGROUND OF THE INVENTION

In the field of AC power conversion a technology for transforming single phase AC voltage to three phase AC voltage has existed in the form of rotary conversion. The rotary converter is known to be a very reliable and durable mechanism for achieving the conversion of single phase voltage into three phase voltage. The benefits of operating equipment on three phase power have long been recognized and appreciated. Particular as it relates the operation of equipment having electric motors. However, the availability of three phase power from a utility can be a problem, particularly in residential and rural areas or locations already provided with single phase power. To overcome this problem various methods are available for converting single phase power into three phase power. These include static converters, electronic converters and rotary converters. In many situations, rotary converters are the device of choice, particularly in view of economics, reliability and flexibility.

The rotary converter has many similarities to a three phase induction motor. The spatial distribution of windings around the periphery of the motor establishes a phase displacement between each of the windings. This phase displacement allows a three phase motor to develop torque when powered by three phase displaced voltages. Similarly, if a three phase motor structure is caused to rotate and is simultaneously energized with a single phase voltage, the additional windings on the motor will generate a voltage with a phase displacement from the energized winding. This action of generating a phase displaced voltage may be used to provide three phase power to an electrical load, such as a motor load, from a single phase source.

The rotary converter has many advantages over other methods of power conversion and a few disadvantages. Rotary converters are very robust and durable. They are tolerant of a wide range of operating conditions including overloads and short circuits, variations in temperatures and fluctuations in output load and input line conditions. Additionally, they do not require moving electrical contacts which are subject to wear, such as brushes or commutators. However, rotary converters do have a number of disadvantages which require consideration when applying these devices. First, the rotary converter does not automatically start itself rotating. It requires electrical or mechanical means to get the rotor of the converter spinning. These techniques include the use of either a single phase starter motor which spins the rotor of the converter before single phase power is applied to the drive winding of the converter or the use of capacitors and switches to impart a phase displaced current in the windings of the rotary converter which cause the rotor to start spinning.

During this starting process it is necessary that the three phase load on the converter be disconnected from the converter and that only the rotary converter is powered. After the rotor is up to speed, the converter is then electrically connected to the desired three phase load or loads. Thus the starting procedure for rotary converters is a multi-step process. After the rotary converter is up and running, it must be left running for the duration in which three phase power is required by the connected load. However, due to the previously mentioned starting sequence, three phase rotary converters are often left running for long periods of time when no electrical load actually requires power. This avoids the need to go through the starting sequence with each usage. However, this has two significant disadvantages. First is an economic issue and the second is an acoustic noise issue.

The rotary converter requires electrical power to run and spin the rotor even when no electrical three phase load is connected. A typical 25 hp rotary converter may consume about 2 kilowatts of power just idling with no connected electrical load. This use of electrical power is a waste of energy and has no value. Additionally, the rotary converter makes acoustic noise similar to that of an electric induction motor. When the three phase load or loads are disconnected from the converter, the background noise of the idling converter can be quite undesirable.

SUMMARY OF THE INVENTION

An object of the invention is to overcome the disadvantages of the traditional rotary converter, specifically the requirement to manually start a rotary converter before connecting the three phase load.

Another object of the invention is to provide a system of an automatic phase converter, that after all three phase loads are turned off, automatically shuts itself off, thereby saving electrical energy and reducing acoustic noise.

Another object of the invention is to provide a system that automatically starts a rotary phase converter based upon detection of a three phase load requirement.

Another object of the invention is to provide a phase converter control system that is adaptive to the number of connected three phase loads.

Yet another object of the invention is to provide a system for control of a three phase converter that may signal an additional electrical device such as an additional rotary phase converter.

Another object of the invention is to provide a system for control of a three phase converter that may signal ancillary equipment such as a dust collector, based on the operation of connected three phase loads.

The invention consists of certain novel features and a combination of sub-systems fully described herein, illustrated in the accompanying drawings and particularly pointed out in the appended claims, it being understood that various changes in the details may be made without departing from the invention or sacrificing the advantages of the invention.

DETAILED DESCRIPTION OF THE INVENTION

A three phase rotary converter has many similarities with a three phase induction motor. Both structures have electrical windings spaced around their periphery and a rotor structure which is free to spin. The rotor has an electrical structure which is magnetically coupled to the stationary windings located around the periphery. The stationary windings are referred to as the stator. Generally, three separate windings forming the stator are placed at about 120 degree increments around the periphery of the motor structure. In the case of a three phase induction motor, these windings are energized by AC voltages which are electrical 120 degrees out of phase with respect to each other. In the case of a three phase rotary converter, one of the windings is energized with a single phase voltage. If the rotor is spun at a speed near the synchronous speed of the structure and an appropriate AC voltage is applied to the drive winding, the rotor will continue to spin. This action is very similar to that which occurs with a single phase induction motor. However, the rotary phase converter has two additional sets of windings that are spaced around the periphery of the motor structure. These windings are magnetically coupled to the rotor. Since the rotor is magnetically coupled to the one energized drive winding, all three windings become energized. Because each of these windings is spaced around the periphery of the structure, these induced voltages on the additional windings have a phase difference from the driven winding which is related to their geometric position. Since these additional windings are spaced about 120 degrees from each other the induced voltages that are likewise about 120 degrees apart. The voltage developed on these additional windings may be used in conjunction with single phase voltage applied to the drive winding to supply three phase voltage to an electrical load. This is the basic principal of operation of an induction type rotary phase converter.

Figure 1:
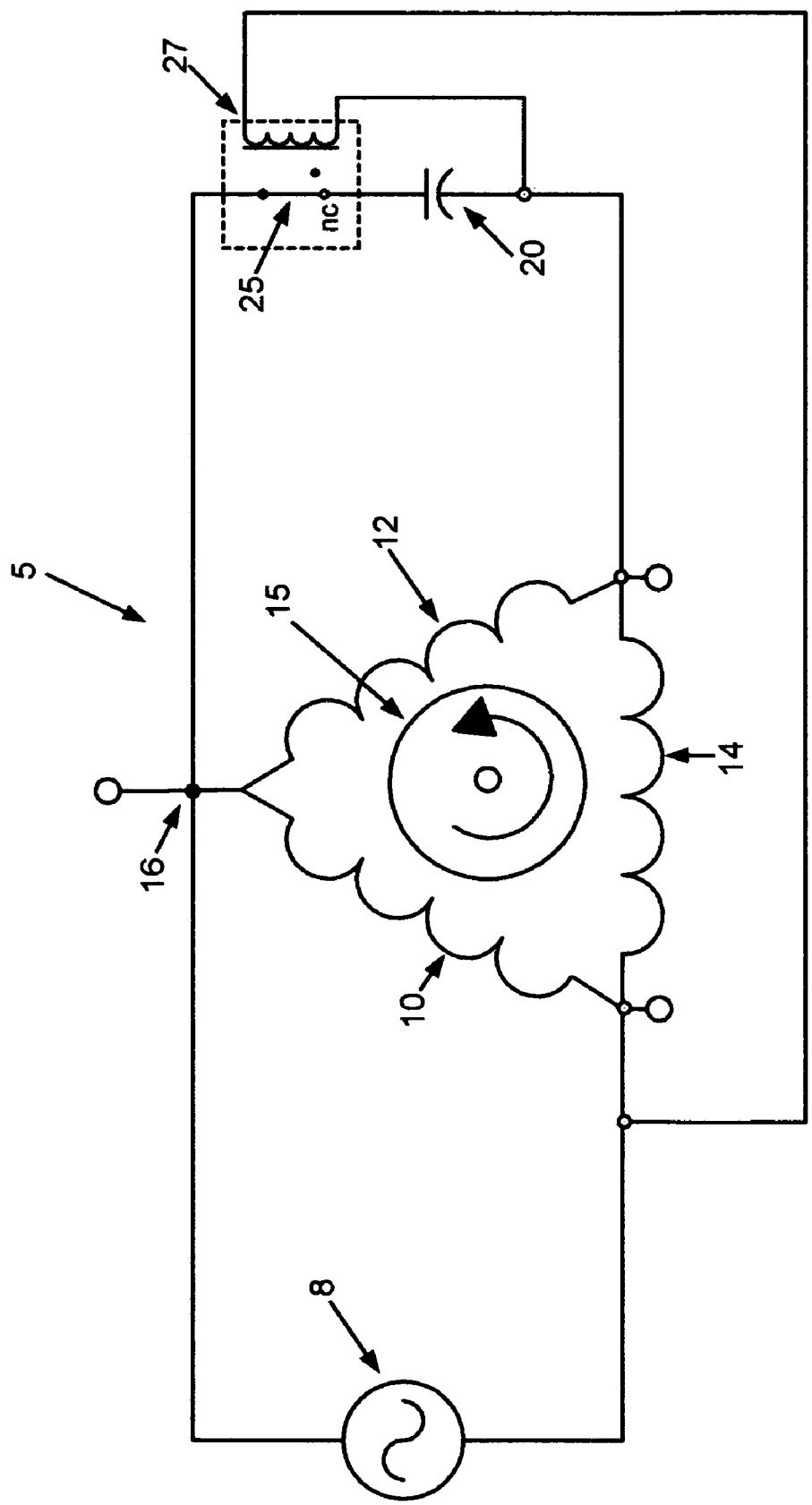
FIG. 1 is a simplified schematic of a rotary phase converter.
Figure 3:
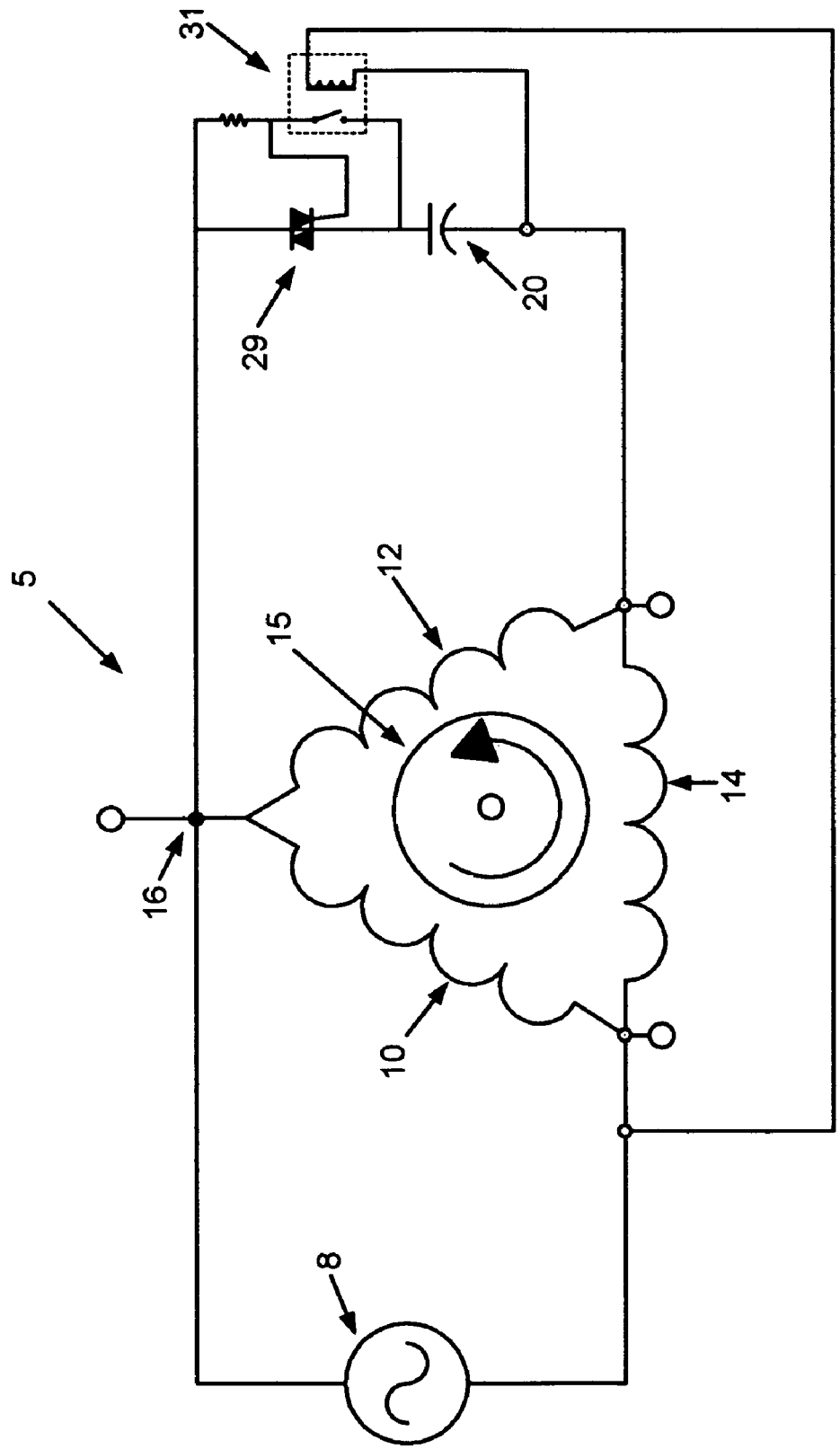
FIG. 3 is a simplified schematic of a rotary phase converter having an electronic starter switch.

A three phase rotary converter requires a specific starting process before it can produce three phase voltages from the connected single phase supply of AC power. The rotor must be brought up to near synchronous speed by a starting process before the converter is capable of continuing to run and operate. The synchronous speed relates to the frequency of operation of the applied voltage to the converter structure and the number of electrical poles. In FIG. 1, a rotary phase converter structure 5 is shown; the converter has one winding for each of the electrical phases. This structure would be considered a two pole induction machine. The synchronous speed of an induction machine is related to the number of winding poles and the drive frequency according the following equation; Ws=f×120/n (rpm) where f is the frequency in Hertz of the applied voltage and n is the number of electrical poles and Ws is the synchronous speed in revolutions per minute. If the rotor 15 is brought up to about 90% of the synchronous speed, and an AC voltage is applied to the drive winding 10 of the converter, then the rotor 15 will continue to rotate and the additional windings 12,14 on the converter will produce an associated phase shifted voltage. Getting the rotor to spin at near synchronous speed on a rotary phase converter can be done in a manner similar to that typically done on a single phase induction motor. As shown in FIG. 1, a capacitor 20 may be connected to the additional windings 12,14 on the phase converter structure 5, through a switch 25 to one terminal 16 of drive winding 10. The drive winding 10 may then be connected to a source 8 of single phase AC voltage. The capacitor creates a phase shifted current in the additional winding 12,14 with respect to the main drive winding 10. This phase shift in current creates a net torque on the rotor 15 and thereby causes it to spin. When properly sized with respect to the impedance of the motor windings and the source of AC supply voltage, the capacitor starting system can bring the rotor up to speed on a rotary converter in about 1 second. However, if capacitor 20 were allowed to remain connected to the windings after the rotor is bought up to speed an excessive amount of current would flow through the capacitor and the windings. This excessive current could result in an overheating of the windings and the capacitor. Therefore, the capacitor must be switched out of circuit once the rotor is up to speed. This may be done with a relay or a semiconductor switch or a speed sensitive switch. Switch 25 in FIG. 1 is part of a relay that provides the function of disconnecting the capacitor once the rotor is up to speed. When a relay is used, as shown in FIG. 1, the relay coil 27 may respond to the voltage produced on an auxiliary winding of the phase converter structure. When the value of the voltage reaches a predetermined level, the energized relay coil causes the relay contacts to open, this disconnects the capacitor from the electrical circuit which provided the starting current through the auxiliary windings. When a speed sensitive switch is used, a set of electrical contacts are connected to a centrifugal switch, when sufficient speed of the rotor is achieved, the switch changes state and disconnects the start capacitor. Either of these start methods are suitable for use with the control system of the invention to get a rotary converter up to speed. Alternately, the mechanical relay of the start circuit can be replaced with electronic components as shown in FIG. 3. In this circuit a thyristor 29 based power circuit controls the connection of the start capacitor to the start winding of the rotary converter. This electronic circuit eliminates the wear mechanism associated with the mechanical type relay of FIG. 1. The pilot relay 31 of FIG. 3. only carries a signal current to shut off the thyristor 29 and thereby has an endurance much greater than that of switch 25 of FIG. 1, which must carry the starting capacitor current. Alternately, pilot relay 31 may be replaced with a suitable opto-coupler and thereby eliminate a wear mechanism of the starting system.

Prior art rotary phase converter systems need to be manually turned on when they are to be used and turned off when three phase power is no longer required. For example, if a three phase converter is used to run a piece of production machinery, the operator of the machinery would first turn on the phase converter by engaging a manual switch or contactor. After the converter was up to speed, the particular piece of machinery could be started via the machine specific start-stop switch. When the machine operation is completed, the machine is shut off at the machine specific start-stop switch, the three phase converter would then be manually turned off at its respective start-stop switch. If multiple machines are connected to the three phase converter output, then the converter either needs to be started and stopped after each machine usage or left running until all machining operations are complete. In this scenario it is likely that the converter will be left running unnecessarily for long periods of time when three phase power is not required by any of the associated three phase loads. Often, in shops equipped with prior art rotary phase converters, the converter is left running throughout an entire production shift regardless of the actual three phase power requirement. This is economically wasteful and acoustically noisy. Alternately, requiring an operator to go from the phase converter's start-stop switch to the specific production machine and back again is very disadvantageous.

The ideal situation is to have a rotary converter that provides power in a manner which appears to be the same as that provided by a utility source. This would be characterized as being done quietly, efficiently and on demand at the connected loads.

Figure 4:
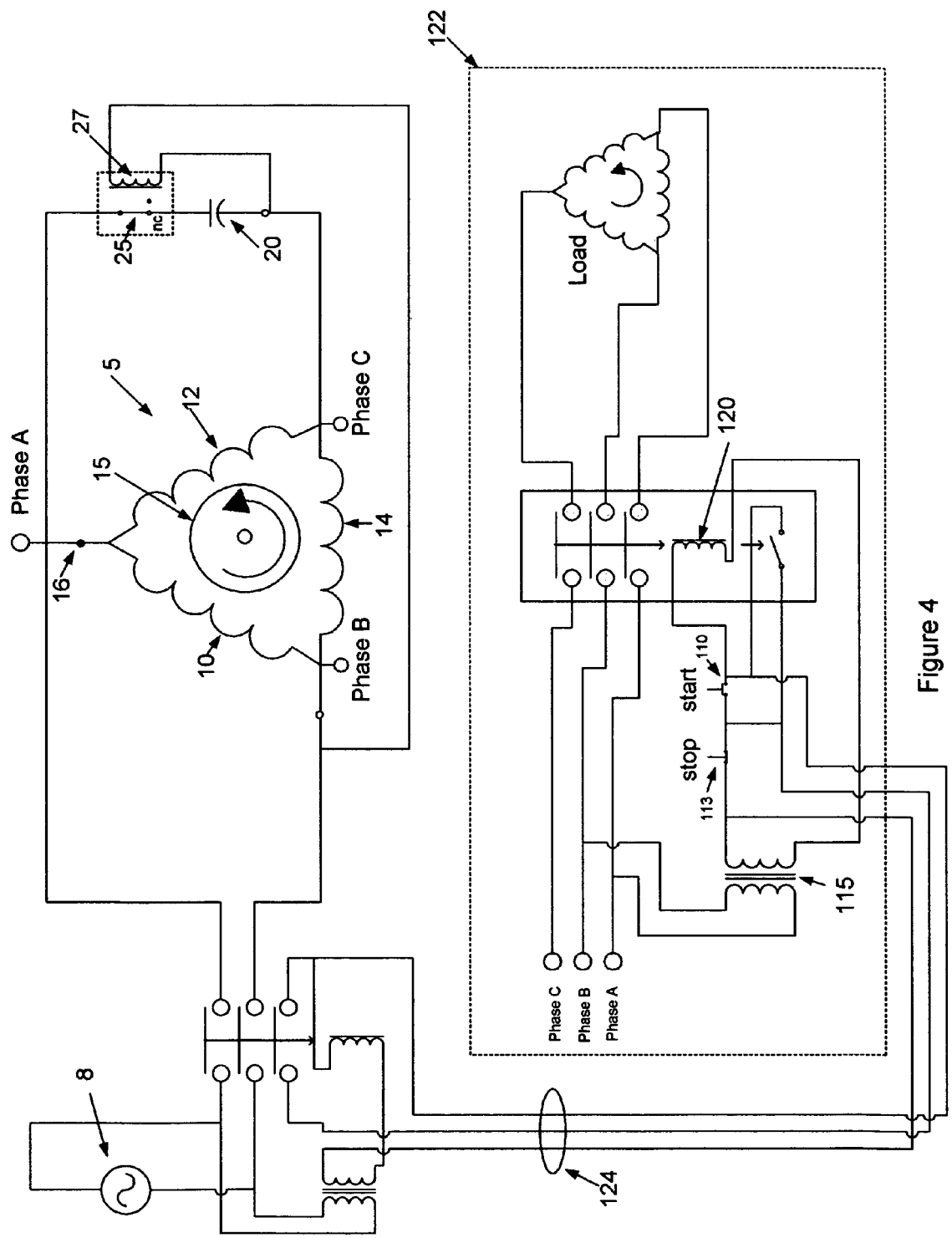
FIG. 4 is a partial schematic of a prior art rotary phase converter system.

The system of start-stop switches on machines and a start-stop switch on the rotary phase converter is a fully manual system. Alternately, as shown in FIG. 4, a prior-art system is shown that has an automated functionality. This system works as follows: The three phase converter has auxiliary input connections 124 that may be wired to each piece of machinery 122 that requires three phase power. Each one of these pieces of machinery has its own machine specific start-stop switch 113,110. These individual machine start-stops may be wired back to the auxiliary input connections 124 of the three phase converter. Effectively, the individual machine's start-stop switch has a set of contacts which cause the three phase converter to be started, if it is not already running, and alternately shut down if the stop button is pressed. When the individual machine is shut off the converter is additionally shut off. This prior art system has a considerable number of disadvantages. In a shop having multiple machines the three phase converter may be cycled on and off as many times as each of the individual machines are turned on and off. This can be detrimental to the capacitor and the capacitor starting means of the rotary phase converter. Additionally, there is a delay at the start of each machine as the converter needs to come up to speed before the individual machine can be turned on. Another disadvantage is that each machine that requires three phase power from the phase converter needs additional start-stop wires run back to the converter. Typically, three additional control wires for each and every machine must be connected to the auxiliary input connections 124 of the three phase converter.

The system of the invention does not require these additional control wires and avoids the detrimental short cycling of the three phase converter. Additionally, the system of the invention requires no modification to the controls associated with each of the individual three phase loads, such as the motor starter controls, nor does it require any additional electrical components be added to the individual three phase loads. The system of the invention is comprised of the following sub-systems: the load impedance detector circuit, the output current detector circuit and the timer delay circuit. These systems are described in detail in the sections that follow; however, the system has the following overall behavior.

Figure 10:
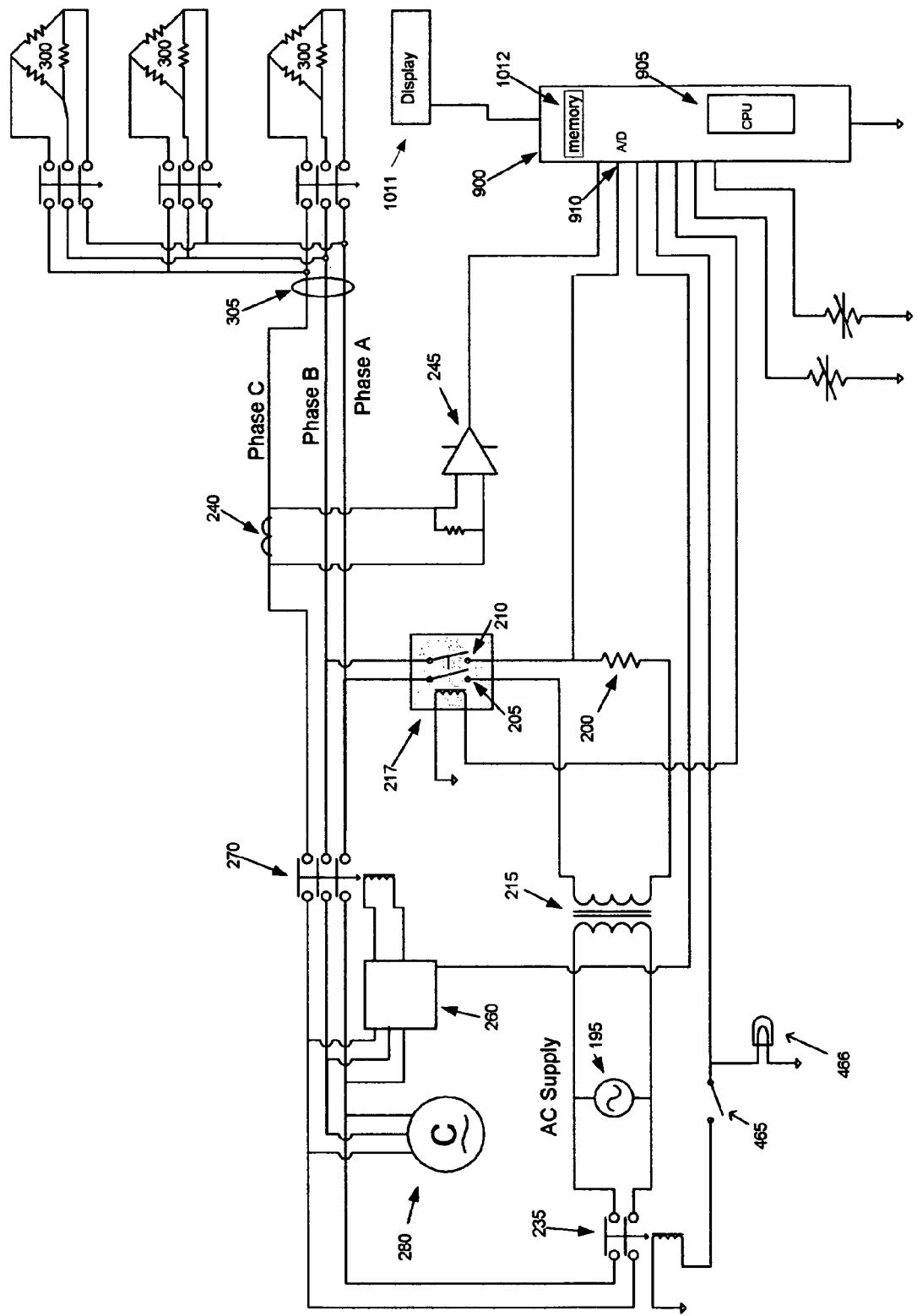
FIG. 10 is a partial schematic of the system of the invention with the logic portion of the control implemented with a microcontroller.
Figure 11:
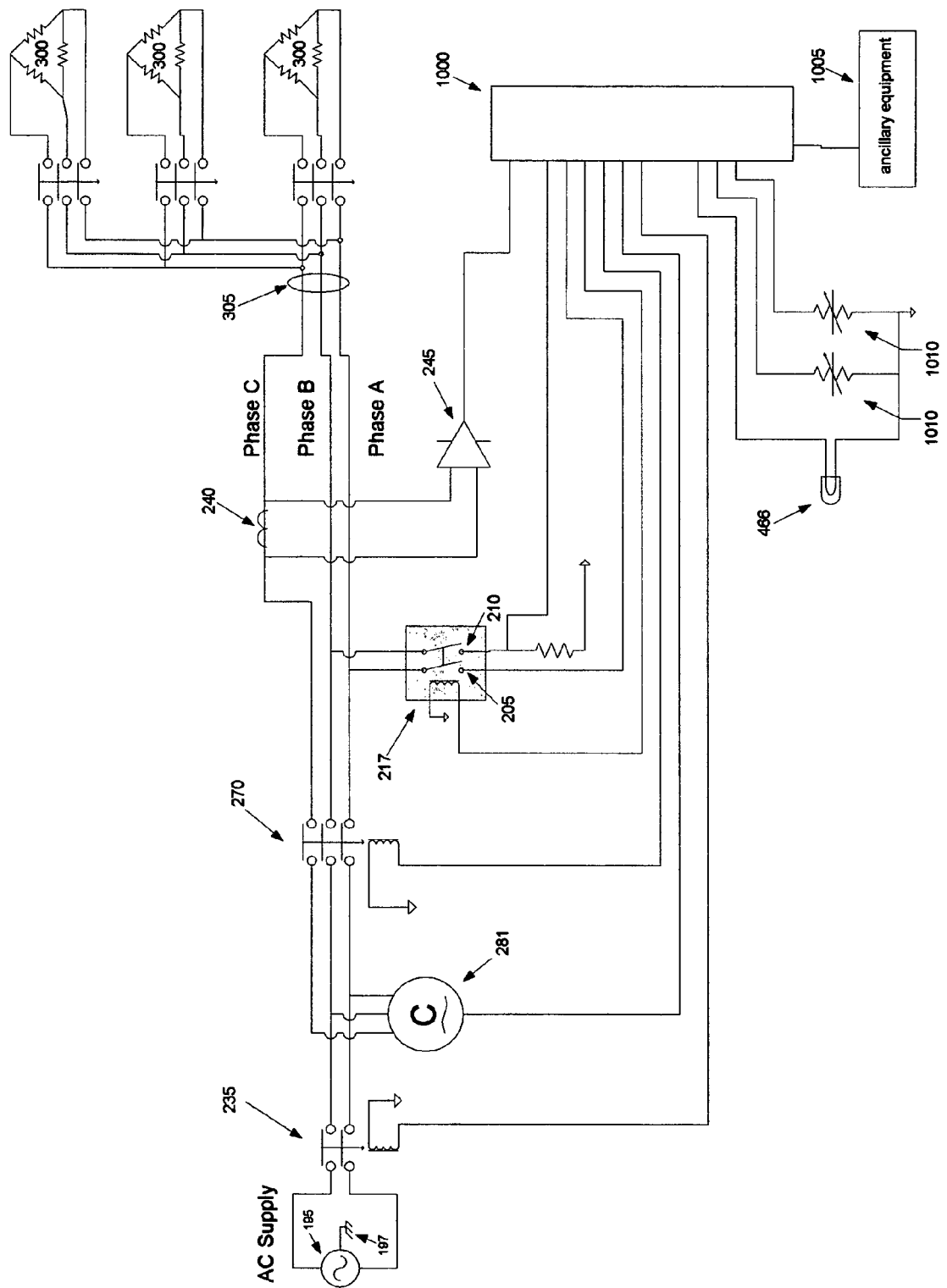
FIG. 11 is a simplified electrical diagram of the system of the invention.

With reference to FIG. 11, an electrical diagram of the invention shown. The system of the invention may control a standard configuration three phase rotary converter structure, as described previously, with its associated capacitor based starting system or an electronic phase converter. As shown in FIG. 11 the three phase converter 281 is identified. The invention adds to the three phase converter a control system 1000 that detects when a three phase load is requesting power to operate, and does so without the use of additional control signaling wires routed to the three phase load 300. The invention also does not require that any additional electronics or signaling devices be added to the three phase loads. The system of the invention detects when a three phase load is attempting to turn "on" and subsequently starts the three phase converter 281 operating. When the three phase converter is operating and producing stable three phase voltages, the control system enables conduction of the three phase voltages to the connected three phase loads 300 via output contactor 270. As long as three phase power is required by a load 300, the control system 1000 ensures that the converter continues to operate. When the three phase load or loads are no longer in use and shut down, the control system 1000 detects this change in load requirement, and if and when appropriate issues a shut-down command which turns off the three phase converter, thereby reducing electrical power consumption and reducing acoustic noise. The levels of detection and delay between turn on and turn off are all under the command of the control system of the invention. Additionally, information regarding the operation of the system may be displayed on a display device 1011 such as shown in FIG. 10. The levels of detection and time delays may be set by potentiometer circuits 1010 and thereby easily adjusted and set-up by a user. Alternately, these inputs may be set up by switch closures which are used to increment or decrement values which may be stored in a memory 1012.

Additionally, the control system of the invention may be configured to signal ancillary equipment 1005, this may be done based on the three phase load current being above or below a pre-selected threshold. For example, the control system may signal a dust collector to run when the load on the three phase converter is equal to or greater than that of the lightest connected load or loads of the system. The system of the invention may also provide signals to additional phase converters to operate and thereby share the connected three phase load. If the load current or power required by the connected three phase load exceeds a pre-selected threshold level an additional phase converter may be brought on line to share the connected load. Rotary converters are easily paralleled for increased power capacity; the control system of the invention may cause a plurality of rotary converters to operate in parallel to satisfy the connected three phase load requirement. When the load requirements are reduced, the system of the invention may then selectively shut down any or all of the additional converters, thereby saving energy.

To analyze the system of the invention consider an example scenario that includes two pieces of equipment which require three phase power to operate, for example a saw and a drill press, the source of single phase AC power will be referred to as the AC supply. Typically, the AC supply voltage 195 is referenced to earth ground 197. Notably, this is just one example and many combinations and permutations of three phases loads may be used with the system of the invention. All the sub-systems of the control system of the invention may collectively be referred to as the control circuit.

Figure 6:
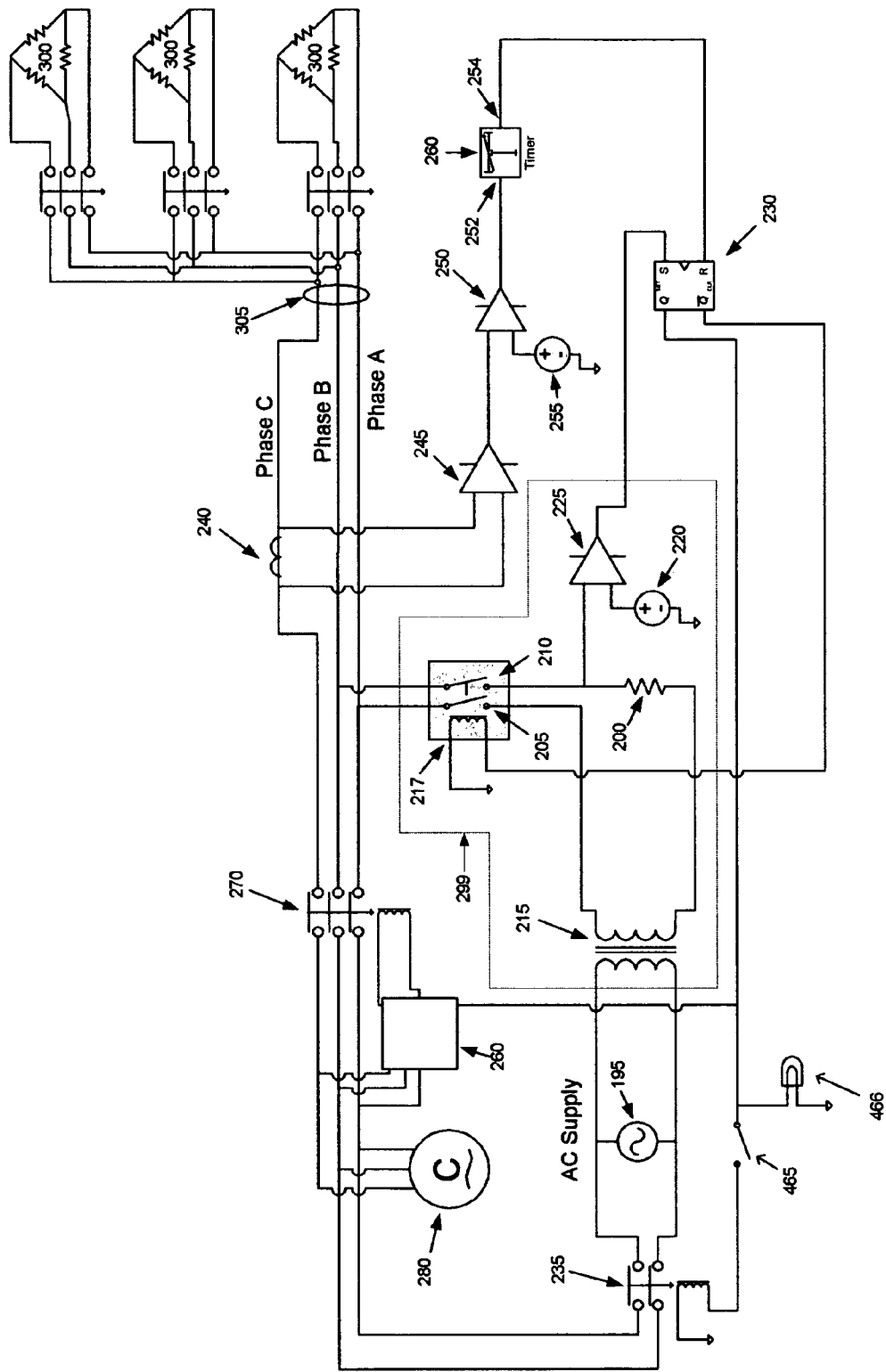
FIG. 6 is a partial schematic of a preferred embodiment of the phase converter system of the invention.

Starting with all machinery in the off state, including the rotary converter, an operator of a machine, such as a saw, presses the machine specific start button on the saw. The control circuit of the invention detects that a request to turn the saw "on" has been made. The control circuit does this by detecting a change in the impedance of the connected three phase load. This mode of operation will be referred to as the standby mode. During the standby mode the control system of the invention is making a determination of whether a three phase load is requesting power to run, or be in an "on" state. The operator's act of pressing the start button on the saw causes a change in the impedance of the electrical load. Each machine's electrical load has a plurality of impedances or a variable impedance. The plurality or variable impedance includes, for example, when the machine is off, when the machine is starting, and when the machine is running continuously. If the machine is equipped with a magnetic type starter, the button press changes the impedance presented to the control circuit of the invention by the motor starter equipment. If the starting equipment is fitted with a mechanical load switch then pressing the start button directly connects the motor windings to the three phase power lines, again presenting a change in impedance. Either of these events is viewed by the impedance detector circuit of the invention as a change in load impedance. Upon detection of this change in load impedance the control circuit energizes a contactor or electronic switch, herein referred to as a switching device, which applies single phase AC supply voltage to the rotary converter. The rotary converter may have a nominal rated input voltage and a nominal rated output voltage. The starter circuit 260 of the rotary converter brings the converter up to speed in a manner as described previously and may be implemented as shown in FIG. 1. As shown in FIG. 6, the control circuit of the invention monitors the output voltage of the phase converter, and in particular the starter circuit 260 may monitor the phase voltages generated by the phase converter 280. When the converter is generating proper three phase voltage, the starter circuit energizes the output contactor 270 which provides three phase voltage to the connected load. The system of the invention is now in the operate mode. In these examples of the invention, the three output phase voltages will be referred to as Phase A, Phase B and Phase C. As can be seen in FIG. 6, when the system is in the operate mode, Phase A and Phase B are passed through the contactors 235 and 270 to the output and Phase C is the generated phase. Notably, contactors 235 and 270 may be traditional electromechanical relays, electronic relays or individual transistors or thyristors, or any suitable electronic switching device.

Once a request for three phase power is made, the control circuit responds by starting the three phase converter by energizing input contactor 235 and follows this by energizing the output contactor 270, the system now enters a condition referred to as the operate mode. When this transition takes place the control circuit may effectively stop monitoring the impedance detector circuit and may begin monitoring the load current required by the connected load. This is done by the load current detector circuit. During the operate mode the control system of the invention monitors the current required by the connected three phase loads to make the decision as to when to turn "off" the three phase converter. When the load current drawn by the connected three phase load exceeds a pre-selected level a turn-off timer is armed. As long as the output current stays above the pre-selected level, the timer stays in this armed condition and does not begin its count down. When the value of load current is reduced below a pre-selected level the timer begins its countdown, for example a one minute count down timer. If no additional load current requirement above the pre-selected level is made during the time out period then at the conclusion of the time out period a turn "off" command will be issued to the input contactor 235. Input contactor 235 is providing input power to the three phase converter. Additionally, a turn "off" command is issued to the output contactor 270, thereby disconnecting the three phase converter from the three phase outputs 305. However, if another machine is turned "on" before the time out period is reached and the machine has a load requirement which exceeds the pre-selected level, then the timer will be reset and the three phase converter will be allowed to continue running, thereby providing three phase power to the machine that was just brought on line. This is done without cycling the three phase converter on and off. In this example, the operator may turn off the saw and then turn on the drill press within one minute and the three phase converter will not shut off, it will just continue to run, thereby providing three phase power for immediate use.

Additionally, during the operate mode, the control system may monitor the load current drawn by three phase loads and may compare the load current to one or more pre-selected threshold levels. These comparisons may cause other events to occur when the load current rises above or falls below these thresholds. For example, if the load current is greater than a pre-selected level, an additional phase converter may be signaled to turn on and share the load requirement of the system. This may be done with an additional rotary converter by selectively connecting an additional converter to the three output phases.

When the three phase load current rises above a pre-selected level a signal may be sent to another piece of machinery such as a dust collector. This feature may be used to enable automatic dust collection control when used, for example, in a wood shop. Additionally, this comparison of connected three phase load current to a pre-selected value may be used to implement an over-current protection mechanism for the three phase converter system.

Figure 7:
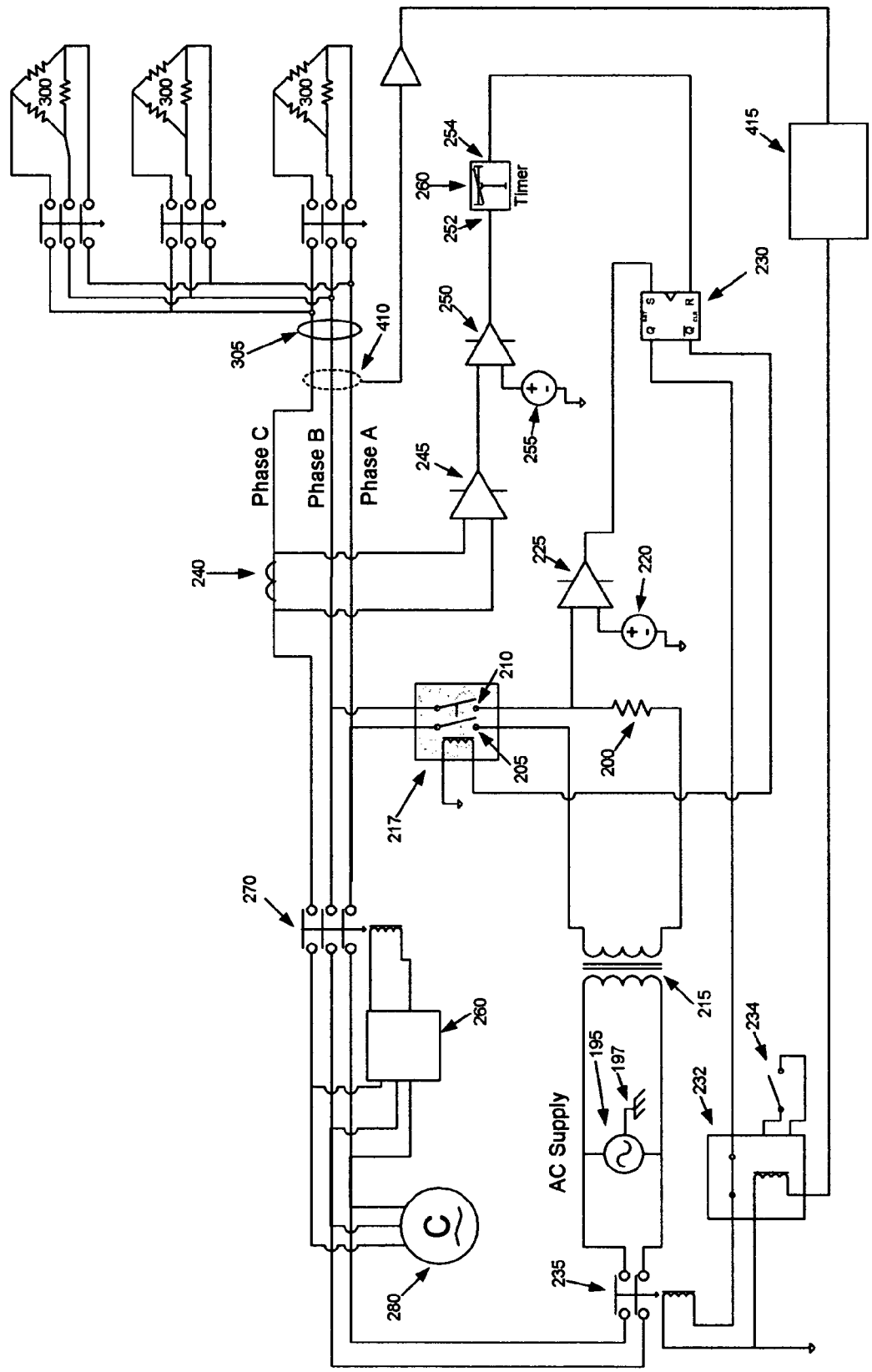
FIG. 7 is a partial schematic of a system of the invention with integral ground fault circuit interrupter.

An additional feature may be added to the converter to further improve operator safety. With the addition of a common mode current transformer 410 on the output phases of the phase converter an earth leakage or ground fault circuit interrupter (gfci) feature may be added to the system of the invention. This feature detects if current is flowing from the source of AC power and returning through earth ground. This condition may occur if there is a fault with the wiring between the output of the three phase converter and the connected three phase loads. As shown in FIG. 7, a common mode transformer 410 may provide a signal to a well know gfci circuit component 415. The gfci circuit is known in the art and is readily available as an asic. (application specific integrated circuit). Therefore, the operation of the gfci requires no further explanation. The gfci circuit may provide a signal which causes relay 232 to become non-conductive. This in turn signals input contactor 235 to be non-conductive, thereby removing power to the phase converter and the connected three phase loads. It will be appreciated that relay 232 has a reset input 234 that requires a user to manually reset relay 232 after the fault condition has been cleared; thereby beneficially preventing an automatic restart of the converter if the fault condition is temporarily reduced.

With the system of the invention, an operator may go back and forth between different machines, for example the saw and drill press and use them as if they were connected to conventional utility power without having to tend to a manual switch controlling the rotary converter. When the load current falls below the threshold level and at the end of the time out period, the converter shuts down, thereby preventing the unnecessary use of electrical power and the creation of unwanted acoustic noise. At the conclusion of the time out period and after the power is removed to the rotary converter, the control circuit returns to the standby mode of operation whereby the detection of a request to operate a three phase load is re-enabled. Further, in the standby mode of operation the rotary converter essentially makes no acoustic noise as compared to the acoustic noise created by the converter during the operate mode. When the acoustic noise is compared at a distance of about 6 feet from the converter the difference between standby mode and operate mode is quite noticeable. Additionally, with the rotary converter running during the operate mode, the power required from the source of single phase power is at least 10 times greater than that required when the rotary converter is shut down and the system is in the standby mode. Therefore, it is highly desirable to have the system enter the standby mode when three phase power is not required by an electrical load connected to the output of the converter.

Load Impedance Detector Circuit

Figure 5:
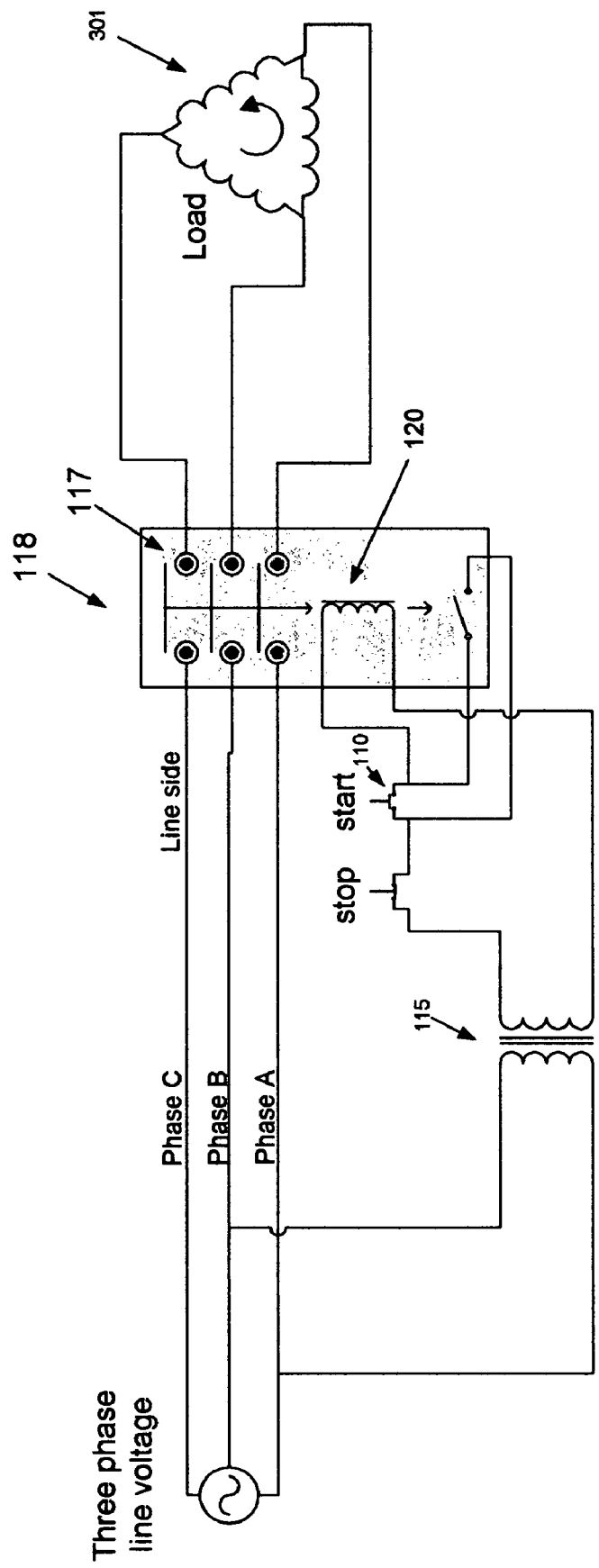
FIG. 5 is a partial schematic of a magnetic motor starter system.

Referring to FIG. 6, the load impedance detector circuit 299 is used to monitor the loads 300 connected to the three phase output 305 of the system of the invention. There may be one or more loads 300 connected to the output of the three phase converter system, additionally; they may be of various sizes. The load 300 of FIG. 6 may be configured as shown in FIG. 5. As shown in FIG. 5, the load includes a magnetic motor starter which is used to connect and disconnect a motor load 301 from a source of three phase power.

During the standby mode, when all the connected loads and the three phase converter are in the "off" state the impedance detector circuit is essentially looking at the connected impedance of the quiescent load on the system. The quiescent load on the system is defined as the load impedance of all of the connected electrical equipment to the three phase power distribution system, when all the loads are in their "off" state. This quiescent load will have an associated current when a voltage is applied to the load. This current may have a non-zero value because electrical loads and particularly motor starters often have transformers and other standby power requirements that are connected even when the piece of machinery is not running. Therefore, even though it outwardly appears that zero current is required by equipment when it is off, a small non-zero amount of current is often required, this can be thought of as the quiescent or stand-by current. The impedance detector circuit must be able to discern between the quiescent or standby current requirements of the system and the current requirement of a single load on the system trying to start. The ability to detect a single machine attempting to start is more difficult than may be appreciated because of low voltage magnetic type motor starters commonly used on induction motor based machinery. This type of starter is shown in FIG. 5. This type of motor starter adds complexity in that the actual motor winding impedance is not presented to the three phase source of power until after the starter contacts 117 actually closes. When the "start" button 110 is pressed on the low voltage motor starter a circuit is completed which includes the transformer 115 and contactor coil 120. These components draw current from two of the phase wires of the three phase line voltage. As shown in FIG. 5, Phase A and Phase B supply voltage to these components. Notably, this starter circuit does not yet apply the impedance of the un-started three phase motor to the line side wires of the three phase contactor 118. In this case, since the line side wires of the contactor would be connected to the three phase outputs 305 of the power converter system, the impedance detector circuit of the invention would be looking at the impedance of the motor starter contactor coil and transformer combination and not the winding impedance on an un-started motor. This may be a load of only a few watts as opposed to the kilowatt sized load of the motor windings during this period when the impedance detector circuit is determining if a start button is being pressed.

To accomplish the goal of detecting the impedance change associated with the press of the start button, the impedance detector circuit must apply a test signal to the connected three phase load. The test signal must be sufficient for reliably detection of the switch closure associated with just a single contactor coil of a single motor starter. However, the test signal voltage must not be so large as to cause damage to the connected three phase load by fully energizing it with a single phase test voltage. For example, if a single phase voltage approximately equal to nominal input voltage of the motor starter was applied as the test signal, the starter contactor 118 of FIG. 5 would fully energize and single phase voltage would be applied to the load. In the case of an induction motor load this could be very detrimental to the motor load.

It was found by experimentation that the use of 24 volts AC applied as a test signal voltage to two of the three output wires was sufficient to meet these criteria. The test signal voltage only needs to be connected to two of the three phase wires because magnetic motor starters only use two of the three phases to drive the coil of their contactor. The impedance detector circuit of the invention is connected to these particular phase connections so as to properly detect the activation of loads connected via these magnetic type starters. In FIG. 6, the impedance detector circuit is shown to be connected to Phase A and Phase B, these correspond to the connections used by the motor starter of FIG. 5. For a three phase converter with a nominal output voltage of 240 volts AC this test signal is about 10% of the nominal output voltage. The schematic of FIG. 6 shows an example of the impedance detector circuit 299. In this example, an AC transformer 215, preferably sized at about 12 VA in capacity and 24 VAC output voltage, supplies a test signal voltage, this voltage is applied through a sense resistor 200, which is preferably about 100 ohms, through relay contacts 205 and 210 to output terminals associated with Phase A and Phase B. The sense resistor 200 will develop a voltage across it in proportion to the current flowing through the resistor. This developed sense voltage is proportional to the current required by the connected loads during the standby mode. This sense voltage is fed to the input of a comparator 225 for comparison against a selectable voltage level 220. The voltage 220 is selected to correspond to the level associated with the start requirement for a single three phase load. The level is additionally selected to be greater than the voltage developed by the standby or quiescent load impedance of the three phase load or loads connected to the three phase outputs 305 of the converter of the system. Preferably, the voltage level 220 is adjustable so that the threshold required for a particular installation can be precisely adjusted. This may be implemented with a potentiometer circuit, thereby providing an easy and familiar adjustment means for a user of the system. Additionally, to aide in the set-up of the converter system upon installation, a mode switch 465 may be incorporated into the system. When the switch 465 is open, the system is in a set-up mode and the voltage level 220 may be adjusted so that threshold level can be adjusted to meet the above criteria for the given installation without actually turning on the three phase converter. An indicator 466 may be used to display whether the threshold level has been properly selected. The indicator 466 will show if the converter will turn on for a given load condition and selected voltage level 220. After the adjustment to voltage level 220 is made, the switch 465 may be closed and the system is now in the normal mode. When a single load requires three phase power, the voltage developed on the sense resistor 200 will exceed the voltage level 220 and thereby cause the comparator 225 to change state. Comparator 225 is connected to the set pin terminal of flip-flop 230. When the comparator 225 changes state, the flip-flop 230 output changes state. The output change of the flip-flop 230 causes an appropriate control signal to be applied to the control input of the switching device, such as contactor 235. This causes the switching device to become conductive. The input contactor 235 applies single phase AC supply voltage 195 to the three phase converter and ultimately to the three phase loads 300. Additionally, the inverted output of the flip-flop 230 removes power from the relay 217 associated with the relay contacts 205 and 210. This drives the contacts 205 and 210 to the open position, thereby removing the load impedance detector circuit test signal voltage from the output of phase converter. This prevents the full AC line voltage from back feeding the load impedance detector circuit during the operate mode. It is preferable to not have full AC line voltage applied to the resistor 200 or comparator 225. These components are typically low voltage components and it is thereby preferable to have relay 217 isolate these components from the output of the converter system when the converter is capable of providing full AC line voltage.

Other suitable test signals and circuit implementations may be used to determine if a load is requesting three phase power. A test signal may be of various waveforms or frequencies and their associated voltages may be higher or lower than the example described as long as they meet the following criteria: The test signal and associated circuit must successfully detect the load impedance change accompanied by a request to supply three phase power and the test signal must not damage the three phase load.

Output Current Detector Circuit

After the load impedance detector circuit has determined that a request for three phase power has been made, the impedance detector circuit signals the input contactor 235 to supply single phase AC supply voltage 195 to the phase converter 280. When the phase converter 280 is implemented as a rotary converter as shown in FIG. 1, there may be an associated start-up sub-system 260. This subsystem 260 may include a starting capacitor and a starting contactor. When the single phase AC supply voltage 195 is applied to the phase converter 280, the converter begins its start-up sequence. As the converter becomes fully operational and is capable of providing three phase output voltage, sub-system 260 provides a signal to the relay coil of output contactor 270. This energizes the relay coil of output contactor 270 and thereby provides three phase output voltage to the connected loads 300. Alternately, the state change of the flip-flop 230 output may also provide a signal directly to start-up sub-system 260 of three phase converter. This signal may provide a signal to connect the start capacitor to a rotary converter as shown in FIG. 1. When the three phase converter is operational and ready to provide three phase output power, the system now enters the operate mode.

During the operate mode, the control circuit of the invention monitors the load current required by the three phase loads 300. This may be accomplished by a circuit such as shown, by example, in FIG. 6. A current transformer 240 is connected to the Phase C output conductor. This conductor carries the load current associated with the manufactured phase of the system. In the system shown in FIG. 6, a rotary converter generates the third phase, which is labeled Phase C, and the source of single phase power provides Phase A and Phase B. As can be seen in FIG. 6, Phase A and Phase B are passed through the input contactor 235 and output contactor 270 to provide power to the loads 300. Phase C is referred to the manufactured phase because it passes through the converter 280, and is manufactured from the single phase AC supply voltage 195. The current transformer 240 measures the output current on Phase C. The signal from the current transformer is passed through an amplifier 245 to develop a suitable signal to pass on to the following stages of the circuit. The amplified current signal from the current transformer 240 is compared to a pre-selected value set by voltage source 255. The comparator 250 determines if the amplified current signal is above a pre-selected value, thereby determining if the output current of the three phase converter has risen above a selectable minimum threshold. If the amplified current signal is above the threshold value, the comparator 250 provides a signal to the timer circuit 260, for example a logic high. When the amplified current signal falls below the threshold, the comparator 250, changes state and thereby changes the signal provided to the timer circuit 260, for example a logic low. This threshold may be selected such that the lightest expected three phase load on the converter causes an amplified current signal to be greater than the threshold. Thereby, allowing the amplified current signal to be less than the threshold when all the three phase loads are in their respective "off" or "standby" state. In this example the comparator would provide a logic low to the timer circuit 260 when the amplified signal is less than the minimum threshold level.

It will be appreciated that the output current detector circuit may be connected to any of the respective output phases of the converter to provide the above detailed functionality. However, monitoring of Phase C, the manufactured phase of the system shown in the example of FIG. 6, has an additionally benefit. If for some reason there were a failure of the three phase converter, there is an increased likelihood that Phase C would be lost as opposed to Phase A and Phase B which are provided directly, via contacts, from the AC supply of single phase power. Therefore, if the three phase converter is damaged or malfunctional, the load current associated with Phase C would be reduced and therefore, the output current detector circuit of the invention would cause the converter to shut down. The shut down of the system thereby preventing possible damage to the connected three phase loads.

Timer Delay Circuit

With reference to FIG. 6, the timer delay circuit receives a signal from the comparator 250. The function of the timer delay circuit is to provide a delay between the time when the amplified current signal falls below the threshold, which indicates that all three phase loads are off, and the time when the three phase converter is turned off by the control circuit. During the time delay interval the three phase converter 280 is left running and the output contactor 270 is left on, thereby allowing three phase output voltage to be available to the three phase loads 300. This time delay allows for a three phase load to be turned "on" during the timer interval without having to re-start the phase converter. The timer delay circuit may have a timer interval of about one minute. However, any timer interval, longer or shorter, is acceptable and may be selected for a particular application of the system of the invention.

The timer delay circuit of FIG. 6 operates in the following manner. When the timer input 252 receives a logic high state from the output of comparator 250 the timer is armed. As long as the timer input 252 remains in the logic high state the timer remains armed and no countdown begins. When the timer input 252 goes to a logic low the timer value begins a countdown towards the timer interval. If, during the countdown of the timer 260, the timer input 252, goes back to a logic high state, then the timer is re-armed and the timer value is reset back the full timer interval. This will occur if all three phase loads are shut off and a three phase load is turned on before the timer value countdown expires by reaching the timer interval. The duration of the countdown is equal to the timer interval, in this case about 1 minute. However, any timer interval suitable for a particular application is acceptable. At the end of the timer interval, the timer output 254 provides a pulse to the reset input of flip-flop 230. The reset of flip-flop 230 cause the input contactor 235 to turn off, thereby removing single phase input power to the phase converter and the connected three phase loads as well. Additionally, the reset of flip-flop 230 causes the control circuit to re-enter the standby mode by activating relay 217 thereby closing its contacts 205 and 210, this reconnects the load impedance detector circuit to the three phase outputs 305 of the system. Additionally, it is preferred that relay 217 closes after the input contactor 235 and output contactor 270 are non-conductive, thereby ensuring that full AC line voltage is no longer present on the output of the power converter system.

Over Current Protection

Figure 9:
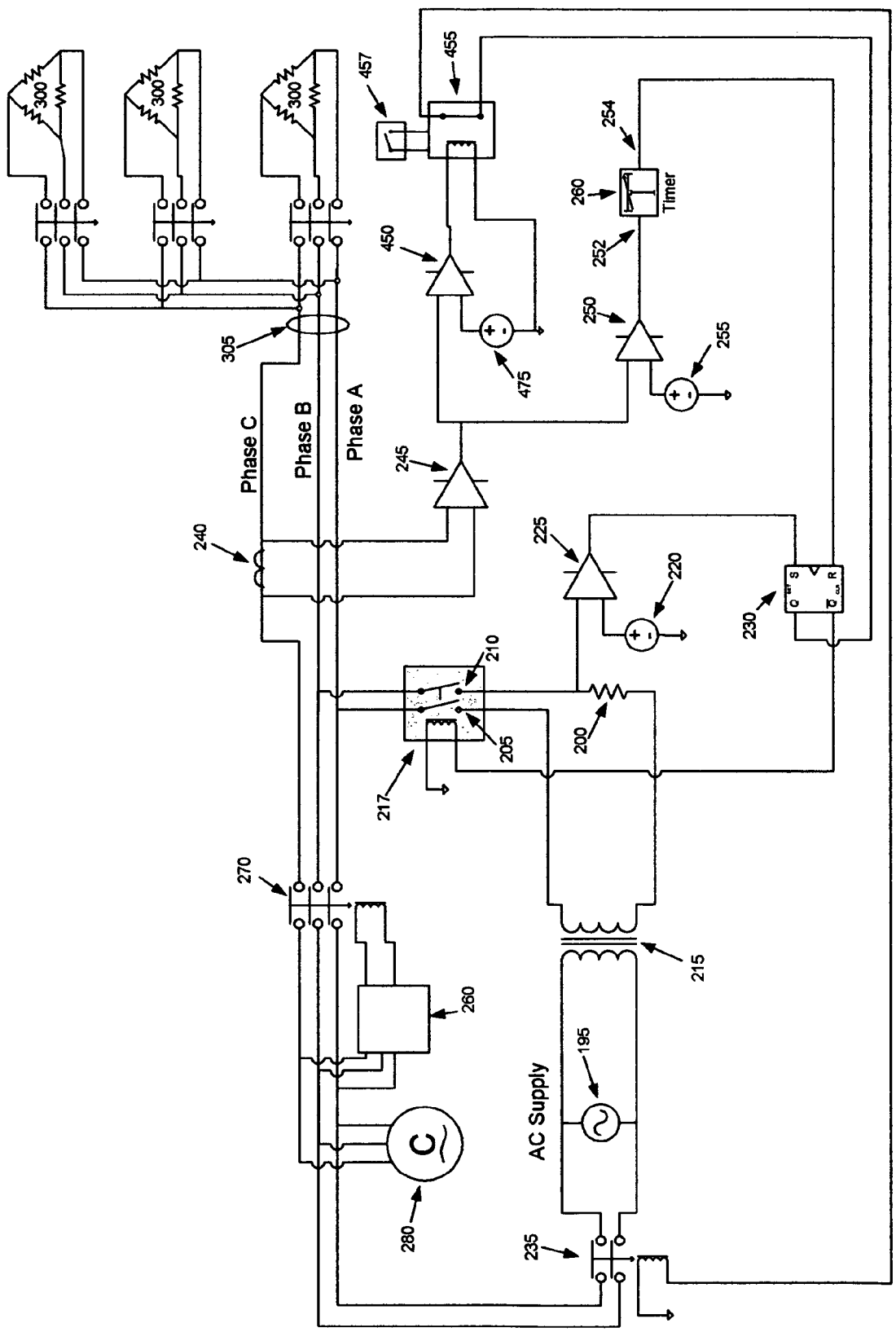
FIG. 9 is a partial schematic of the system of the invention with the additional feature of over current protection.

Referring to FIG. 9, an embodiment of the invention is shown in which current transformer 240 is additionally used as a part of the system with an added feature of over current protection. The amplified signal from amplifier 245 is compared against a threshold level 475 by comparator 450. The threshold level 475 is selected to correspond with the maximum safe output current that the power converter can provide to the connected three phase load. If the maximum current drawn by the three phase load exceeds this maximum level the comparator 450 will change states. The output of comparator 450 may provide a signal to a relay 455 which disables the control signal to input contactor 235. Thereby, driving input contactor 235 to a non-conductive state. Relay 455 is manually reset by switch 457 after the over load condition is corrected.

Control of Ancillary Equipment

Figure 2:
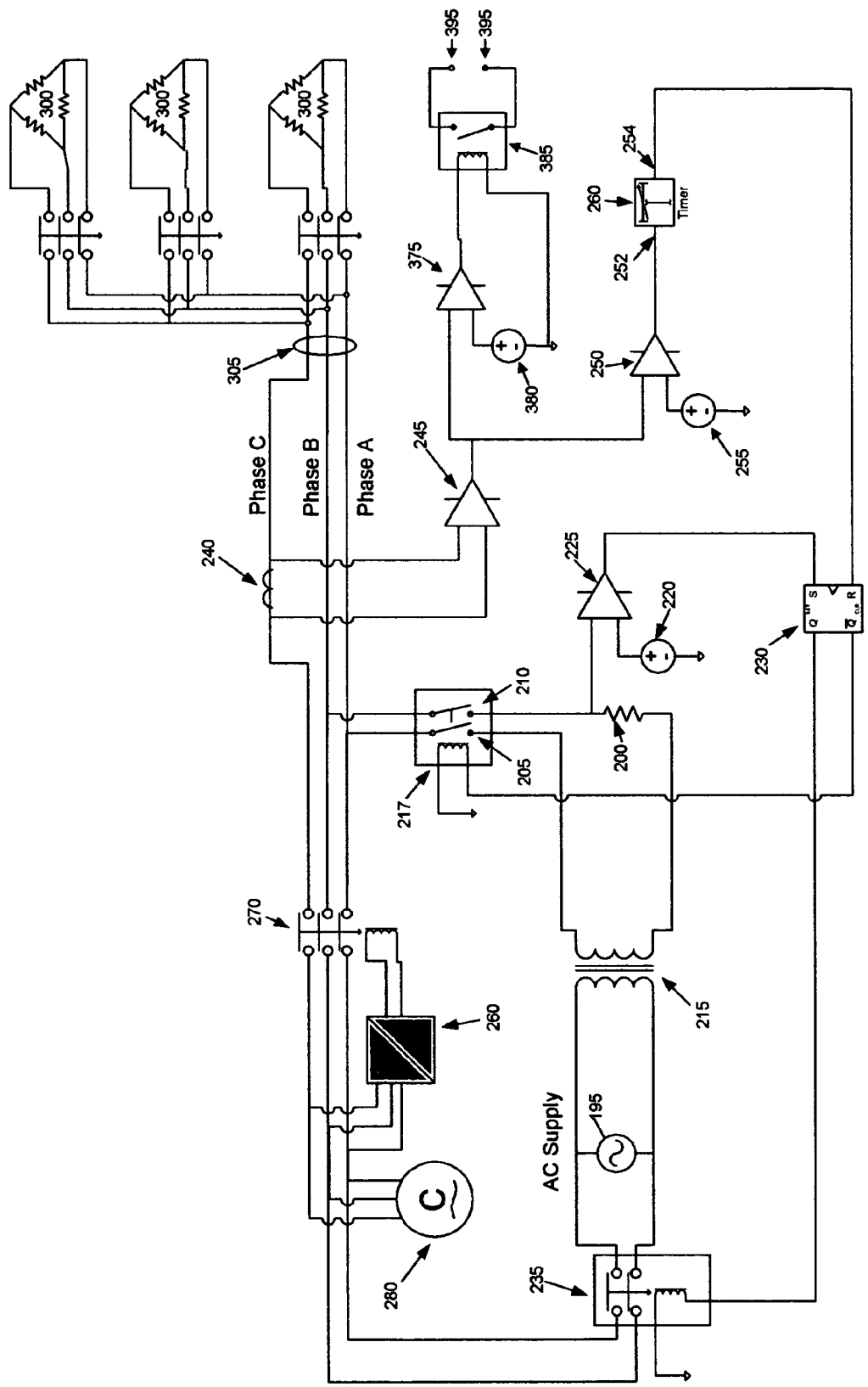
FIG. 2 is a partial schematic of the automatic phase converter system of the invention with an output for ancillary equipment.

As described above the system of the invention may be used to control other pieces of electrical equipment such as a dust collector or vacuum system. The output current detector circuit may be configured as shown in FIG. 2 to accomplish this added function. When the three phase converter is running and providing power to the connected three phase loads the current transformer 240 detects the current on Phase C. The signal may be routed to comparator 375 for comparison against a selectable threshold level 380. When the output current of the three phase converter exceeds that which corresponds to the selection set by threshold level 380, the comparator 375 change states. Comparator 375 may provide a suitable signal to relay 385 which in turn provides an isolated switch closure output 395 for driving the motor starter on a dust collector or vacuum system or any ancillary piece of electrical equipment. Additionally, the motor starter for the dust collector may be integrated into the enclosure containing the control system of the invention.

Figure 8:
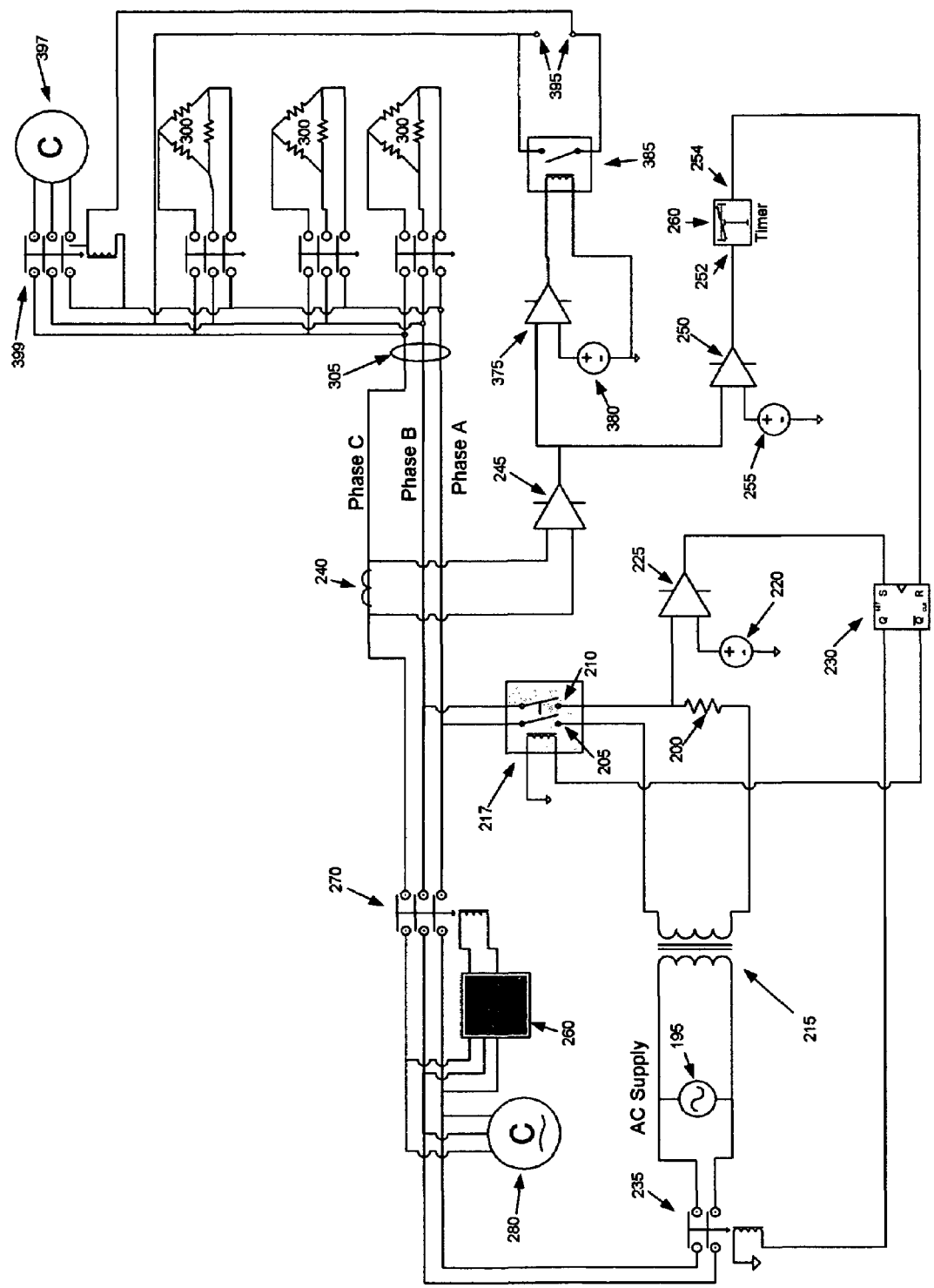
FIG. 8 is a partial schematic of a system of the invention with control of the parallel operation of additional rotary phase converters.

A modification to FIG. 2 is shown in FIG. 8; the isolated switch closure output 395 is used to drive a three phase contactor 399 which connects an additional phase converter 397 to the three phase outputs 305. This effectively parallels a plurality of phase converters. This configuration may provide additionally output power capability to the system, particularly when trying to start large motor loads. A system with multiple smaller converters may be more economic to acquire and operate as opposed to a single larger converter.

The control circuit of the invention contains a number of threshold values used for comparison against electrical parameters of three phase loads. In many cases it is useful for these threshold values to be field adjustable or selectable by the user to tailor the system to particular conditions associated with the connected loads. In the examples depicted in the figures, the voltage sources used as threshold levels may be replace with potentiometer circuits or other suitable means to provide for adjustable threshold levels.

The control circuit of the invention has been shown with a series of examples, it will be appreciated that numerous modifications can be made to the circuits as shown without departing from the invention. For example, the contactors may be replaced with electronic components such as electronic relays or thyristors. The analog control circuits and logic may be implemented with other technologies such as microcontrollers or programmable logic devices which include central processing units (cpu's).

As shown in FIG. 10, an example system of the invention is shown implemented with a microcontroller 900, having a cpu 905, performing the logic functions of the control circuit. The microcontroller 900 receives as inputs, signals from the load impedance detector circuit, and the output current detector circuit. The microcontroller performs the timing functions described previously and provides as outputs, signals to the appropriate input and output contactors. Additionally the microcontroller may provide outputs to ancillary loads to control their operation based on conditional behavior of the system. The microcontroller may also provide information to a display 1011 such as an LCD or LED display. It may be advantageous to provide the user of the system of the invention information regarding the threshold levels used to control the phase converter or phase converters of the system. Additionally, information regarding the timer value or the presently connected load to the system may be displayed.

The microcontroller 900 is also well suited to automate the selection of the impedance detector threshold level. Received on input 910 of the microcontroller is a signal related to the impedance of the three phase loads during the standby mode. The microcontroller is well suited to receive an analog voltage on an input port such as input 910 into an onboard analog to digital converter (A/D). With a digital representation of the impedance of the connected three phase load, the microcontroller may take a long term average of the impedance value. The microcontroller may then use this long term average value to select the threshold level for detecting if a three phase load is requesting power to operate for example a piece of machinery. The microcontroller may therefore adaptively select the threshold level for detection of changes to the connected three phase load. This is advantageous in that the microcontroller may raise or lower the threshold level when changes are made to the total number of three phase loads. The following example demonstrates how this feature may be implemented. Starting with the example shown in FIG. 10, three, three phase loads 300 are shown connected to the outputs 305 of the phase converter system. When the system is first powered by the single phase supply, the microcontroller commands the input contactor 235 and output contactor 270 to be in the non-conductive state. The system is in the standby mode. The microcontroller records the signal derived from resistor 200, this signal is related to the standby or quiescent current required by loads 300. The microcontroller averages this value over a period of time, for example 5 seconds, allowing the loads to stabilize. When the running average of the signal presented to the input pin 910 is stable, the microcontroller may store this value in a memory 1012 for use as a basis for the comparison threshold used to start the converter. When a three phase load calls for power, as signaled by a change in impedance of the three phase load, the system of the invention starts the three phase converter and provides power to the three phase loads. When the three phase loads return to their standby or quiescent level the microcontroller then shuts off the three phase converter and returns to the standby mode. The microcontroller may then check the signal available on pin 910 and compare that signal against the long term average value previously stored in its memory 1012. If the new value on pin 910 is different than it previously was, the microcontroller may update the average value and reset the corresponding threshold level. This may be particularly useful if a new three phase load is added to the system. For example, if an additionally three phase load 300 is added to the system of FIG. 10, the total number of loads will increase to four. If all the loads 300 are the same, the corresponding standby current will thereby increase by about 33%. The microcontroller may correspondingly adapt to this new value of standby current without requiring a readjustment of a potentiometer for the impedance detector threshold.

With the above functionality described for use with example systems shown in the figures, it is within the skill of one in the art to write the specific software for a particular microcontroller to perform the functions of the invention as previously described. The relationship between the standby mode and operate mode and the functionality of the converter has been fully described for implementation with analog circuitry and may be implemented in a microcontroller programmed with software to carry out those functions.

Additionally, the rotary converter may be implemented with an electronic converter. It will be appreciated that the components of the system may be divided into a plurality of enclosures or combined into a single enclosure without departing from the invention. The examples described are illustrative of the invention and are not limiting, the scope of the invention is defined by the appended claims.

I claim:

1. An electronic control system for controlling the operation of a three phase power converter having a nominal rated output voltage, the converter having an input connectable to a source of single phase power and an output, the output connectable to an electrical load having a variable impedance, the control system comprising:
   a switching device capable of connecting the input of the converter to the source of single phase power, wherein the conductivity of the switching device is controlled by a control signal;
   an impedance detector circuit coupled to the output of the power converter, the impedance detector circuit responsive to the value of the variable impedance of the electrical load and providing a first signal indicative of a change in the variable impedance with respect to a first pre-selected value, the first signal defining the control signal for control of the switching device, the first signal enabling the switching device to be in a conductive state;
   a first load current detector circuit coupled to the output of the power converter, the first load current detector circuit responsive to the amount of current provided by the output of the converter to the electrical load and providing a second signal indicative of a change in the output current with respect to a second pre-selected value.

2. The control system of claim 1, wherein the output of the three phase power converter is electrically referenced to earth ground;
   the control system further comprising a second current detector circuit, the second current detector circuit coupled to the output of the power converter,
   the current detector circuit providing a third signal indicative of current passing through the output and returning to earth ground, wherein the third signal causes the switching device to enter a non-conductive state.

3. The control system of claim 1, wherein the three phase power converter comprises a rotary phase converter having a start input connection, the control system additionally providing a start signal to the start input connection in response to a reduction in the variable impedance of the electrical load below the first pre-selected value.

4. The electronic control system of claim 1, wherein the second signal indicative of a change in the output current of the three phase converter causes the switching device to become non-conductive.

5. The electronic control system of claim 1, wherein the load current detector circuit coupled to the output of the power converter additionally comprises a forth signal indicative of the amount of load current drawn from the output of the power converter exceeding a third pre-selected value.

6. The control system of claim 5, wherein the three phase power converter further comprises a first rotary converter and a second rotary converter, and wherein the forth signal indicative of a load current greater than the third pre-selected value enables the operation of the second rotary converter, the second rotary converter being selectably connected in parallel with the first rotary phase converter.

7. The control system of claim 5, wherein the forth signal indicative of a load current greater than the third pre-selected value enables the operation of an ancillary equipment.

8. The control system of claim 5, wherein the third pre-selected value is user adjustable.

9. The control system of claim 1, further comprising a microcontroller, wherein the microcontroller monitors the output of the impedance detector circuit and determines the value of the first pre-selected value based on an average value of the output of the impedance detector circuit.

10. The control system of claim 1, wherein the impedance detector circuit further comprises a test signal for determining the change in connected load impedance, the test signal having a magnitude of about 10% of the nominal rated output voltage of the converter.

11. The control system of claim 1, further comprising a mode switch, the mode switch providing at least one of a set-up mode and a normal mode of the electronic control system, wherein, in the set-up mode, the system is adjustable to select the first pre-selected value without causing the switching device to become conductive.

12. The electronic control system of claim 1, further comprising a timer having a timer value, a timer interval, a reset input, and a timer output;
   the timer reset input responsive to the second signal indicative of a change of the load current, the timer value counting towards the timer interval when the timer reset input receives a signal and the timer output changing state when the timer value equals the timer interval;
   the timer output state change causing the switching device to become non-conductive.

13. The electronic control system of claim 12, wherein the timer reset input resets the timer value regardless of state of timer value when the reset is received.

14. An electronic control system for controlling the operation of a three phase power converter, the converter having an output, the output connectable to an electrical load having a variable impedance, the control system comprising:
   a central processing unit;
   a switching device capable of connecting an input of the converter to a source of single phase power, wherein the conductivity of the switching device is controlled by control signal;
   an impedance detector circuit coupled to the output of the power converter and the central processing unit, wherein the impedance detector circuit is responsive to the value of the variable impedance of the electrical load and provides a first signal indicative of the value of the variable impedance to the central processing unit; and a load current detector circuit coupled to the output of the power converter and the central processing unit, wherein the load current detector circuit is responsive to the amount of load current provided by the output of the converter and provides a second signal indicative of the load current to the central processing unit, and wherein the central processing unit providing a control signal to the switching device based on at least one of the first or second signals.

15. The electronic control system of claim 14, wherein the load impedance has a plurality of conditional based values comprising at least a first impedance value when the load is in an off mode, a second value when the load is being started and a third value when the load is in an on mode, the central processing unit enabling the conduction of the switching device when the load impedance transitions from the off mode to one of either the start mode or the on mode.

16. The electronic control system of claim 15, wherein the central processing unit disables the conduction of the switching device after the load current transitions from a value associated with the on mode of the load to the value associated with the off mode of the load.

17. The electronic control system of claim 15, wherein the central processing unit determines a transition level for enabling the conduction of the switching device based on the value of the first indicating signal from the impedance detector circuit.

18. The electronic control system of claim 14, further comprising a display for displaying information received from at least one of the impedance detector circuit or load current detector circuit.

* * * * *